United States Patent [19]

Carrick et al.

[11] Patent Number: 6,083,546
[45] Date of Patent: *Jul. 4, 2000

[54] METHOD OF MAKING ICE CONFECTIONS

[75] Inventors: Gordon Stewart Carrick; Kay Jennifer Duff; Thomas David Houlihan; Sheila Smith, all of Gloucestershire, United Kingdom

[73] Assignee: Good Humor Corporation, Englewood Cliffs, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/659,073

[22] Filed: Jun. 4, 1996

Related U.S. Application Data

[63] Continuation of application No. 08/384,285, Feb. 1, 1995, abandoned.

[30] Foreign Application Priority Data

Feb. 4, 1994 [EP] European Pat. Off. .............. 94300821

[51] Int. Cl.⁷ ..................................................... A23G 9/07

[52] U.S. Cl. .......................... 426/305; 426/524; 426/565; 426/68; 426/91; 426/101

[58] Field of Search ................................ 426/68, 91, 100, 426/101, 134, 565, 249, 524, 302, 305

[56] References Cited

U.S. PATENT DOCUMENTS

| | | | |
|---|---|---|---|
| 1,638,548 | 8/1927 | Nelson | 426/101 |
| 2,360,559 | 10/1944 | Glazier | 99/136 |
| 2,747,525 | 5/1956 | Lund | 426/249 |
| 3,648,625 | 3/1972 | Glass | 425/93 |
| 3,752,678 | 8/1973 | Jenkinson et al. | 99/136 |
| 4,104,411 | 8/1978 | Pooler | 426/100 |
| 4,507,326 | 3/1985 | Tarantino | 426/101 |
| 4,548,045 | 10/1985 | Altares et al. | 62/63 |
| 4,746,523 | 5/1988 | Binley | 426/249 |
| 4,826,656 | 5/1989 | Huber . | |
| 5,212,960 | 5/1993 | Waldstrom | 426/518 |
| 5,256,426 | 10/1993 | Tomioka et al. | 426/100 |
| 5,409,722 | 4/1995 | Binley | 426/515 |
| 5,660,866 | 8/1997 | Tomioka et al. | 426/100 |

FOREIGN PATENT DOCUMENTS

| | | |
|---|---|---|
| 0 201 143 | 8/1991 | European Pat. Off. . |
| 0500940 | 9/1992 | European Pat. Off. . |
| 0560052 | 9/1993 | European Pat. Off. . |
| 0560052 A2 | 9/1993 | European Pat. Off. . |
| 2 052616 | of 0000 | Germany . |
| 2052616 | 12/1971 | Germany . |
| 5-219893 | 8/1993 | Japan . |
| 170957 | 5/1975 | New Zealand . |
| 1 308 713 | of 0000 | United Kingdom . |
| 2075326 | 11/1981 | United Kingdom . |

OTHER PUBLICATIONS

Arbuckle, "Ice Cream", 3rd Ed. pp. 318, 319, 245–246, 323–330, 1977.

Nestle (1) Notice of Opposition and Grounds of Opposition.

Schöller Notice of Opposition and Grounds of Opposition; German/English translation.

Yorkshire Dales Notice of Opposition Oct. 22, 1997 and Grounds of Opposition.

Arbuckle, Ice Cream, 4th Edition (1982) Extract Production Systems Specialty Equipment, Figure 14.1.

Frisa Notice of Opposition Oct. 30, 1997 and Grounds of Opposition.

Theory and Practice of the Confectionerby J.M. Rich Weber; Second Edition, 5 pgs.

IJS & Sorbet; JFF Damme (no translation) pp. 68 & 86.

Nestle (2); Notice of Opposition,Facts and Arguments.

Ice Cream 4th Ed. (1982) p. 304.

A Dictionary of Dairying (1963). G. Davic Leonard Hill Books Ltd. pp. 529–531.

Midor AG. Notice of Opposition and Grounds of Opposition, German/English.

Dr. Fritz Timm, "Speiseeis", pp. 20, 21.

Arbuckle, "Ice Cream", 3rd Edition; pp. 240–241; 246; 292–302; & 383.

Nestle (3); Notice of OppositionandGrounds of Opposition.

"Ice Cream", WS Arbuckle. Fourth Edition. Van Nostrand Reinhold,New York, 1986. Available in New Zealand 1987. pp. 290–295.

"A Dictionary of Dairying", JG Davis, Second Edition, Leonard Hill Lts., London, 1955. Available in New Zealand, Apr. 22, 1955. pp. 522–533.

"Dairy Handbook and Dictionary", Professor JH Frandsen, Editor, JH Frandsen, Amherst, Massachusetts, 1958. Available in New Zealand, Nov. 20, 1059. pp. 594–615.

Tip Top Ice Cream: Notice of Opposition and Grounds of Opposition.

Arbuckle Fourth Edition pp. 1–3; 286–296; 262–268 (1986).

J. Soc Diary Technology 1009, 43(1) pp 17–20.

O. Fennema and W.D. Powrie, 1964. "Fundamentalsof Low–TemperaturePreservation."Advances in Food Research vol. 13; Academic Press, Orlando, Florida. pp. 220–249, 254–259, 292–334.

"A Dictionary of Dairying" (1963) J.G. Davis, Leonard Hill (Books) Ltd. at p. 530.

"Annexure C" is a chart showing the thus far determinedrelationship of New Zealand Patent Application No. 279495 to the related family of applications of Unilever PLC.

(List continued on next page.)

Primary Examiner—Cynthia L. Nessler
Attorney, Agent, or Firm—James J. Farrell

[57] ABSTRACT

A two component ice confection is formed by cooling an ice confection core to below –15° C., preferably using a cryogenic liquid, then immersing it in a water ice solution to form a layer of water ice on the core, and then hardening the water ice layer. Products formed by the process preferably have an average ice crystal size of below 100 micron.

6 Claims, No Drawings

OTHER PUBLICATIONS

"Annexure D" is a copy of European Patent SpecificationEP 0 710 074 B1 which has been subject to the Publication and MentionofGrant Procedure.
Notices of Opposition (4) is enclosed as "Annexure F". Nestec SA, Schöller Lebensmittel GmnH & Co. Kh, Midor AG, and NestleNetherland BV.
"Annexure G" is a letter purportedly received from Streets Ice Cream (a division of Unilever Australia Ltd). NSW, Australia dated Jan. 15, 1966, and a letter dated Mar. 1997, purportedly from Unilever Australia Limited.
Italian Litigation.
Motion by Unilever for Preliminary Injunction in English Jan. 20, 1997.
Statement for Defendant Nestle (English).
Mar. 3, 1997 Italian notice of decision denying motion & English translation.
Apr. 3, 1997 Brief appealing denial—English Translation.
May 26, 1997 Decision denying the appeal.
Dutch Litigation.
Unilever Statement of Claim against Nestle.
Amend Declaration on Fig. 10 of Kanebo Oct. 14, 1997.
Nestle's Response at 1st Instance Apr. 22, 11 pgs. English.
Dutch court 1st Decision. English 11 pgs., May 26, 1997.
Unilever appeal English 17 pgs. Jun. 9, 1997.
Nestle's Response to Unilever appeal & Nestle's incidental appeal. English 15 pgs.
Unilever Response to Nestle's incidental appeal, Oct. 2, 1997 & English, 3 pgs.
Annexure E, a part of the European Patent File wrapper, submitted by Nestle in the Opposition includes.
Cover letter from Boult Wade Tennant dated Jan. 28, 1997.
International Preliminary Examination Report in the application of PCT/EP 95/00384 with completion date of Mar. 19, 1996—5 pages.
Amended sheets, pp. 2 and 2A, of the application of PCT/EP 95/00384.
Communication pursuant to Article(2) and Rule 51(2) in the application of EP 95908256.1 dated Jul. 30, 1996 from the European Patent Office—5 pages.
Two copies of Amended sheets, pp. 9 and 10, of the EP application 95908256.1.
Cover letter and amended claims 1–8 to the European Patent Office in the application 95908256.1 dated Mar. 27, 1996—3 pages.
Cover letter dated to the European Patent Office in the application 95908256.1 dated Aug. 15, 1996—1 page.
Communication from the European Patent Office dated Aug. 23, 1996—1 page.
Response to the European Patent Office's Communication pursuant to Article 96(2) and Rule 52(2) dated Aug. 19, 1996—3 pages.
Technical Report by David Buchanan—3 pages.
Documents for Grant of Patent in the application of application 95908256.1—2 pages.
Communication under Rule 51(4) EPC from the European Patent Office in the application of 95908256.1.
Two form pages from the European Patent Office in the application of 95908256.1 and marked up application, pp. 1–10.
Cover letter to the European Patent Office in the application of 95908256.1 approving text dated Oct. 18, 1999—1 page.
English language translation of Pleading Notes of J. A. van Arkel—30 pages.
Protest filed on behalf of Wells Dairy. A revised Protest has also been included.
Declaration of Timothy J. R. Wilson, Managing Director, Yorkshire Dales Ice Cream Ltd. Oct. 1997.
W.S. Arbuckle, *Ice Cream,* 3d ed. (1977) pp. 240, 241.
W.S. Arbuckle, *Ice Cream,* 4th ed. (1986) pp. 304–305.
J. Damme, *IJS & Sorbet,* (1991) p. 68, 86.
F. Timm, *Speiseeis,* 21 (1985) p. 20–21.
J.M. Erich Weber–Dresden, *Theory & Practice of the Confectioner,* 2d ed. (1929) p. 79.
J.G. Davis, *A Dictionary of Dairying,* (1963) pp. 529–531.
Arbuckle, W.S., "Ice Cream", The Avi Publishing Company, Inc. (1972).
Hamilton, M., "Ice Cream Manufacture", *Journal of the Society of Dairy Technology,* (1990) vol. 43, No. 1, pp. 17–20.
Ice Cream, 3rd Edition, W.S. Arbuckle, Ch. 15 p. 292–302, p. 383, p. 246 AVI Publishing, 1977.
Interlocutory Decision in Opposition Proceedings under Article 106(3) EPC from the European Patent Office in the opposition of EP 95908256.1 at the Oral Proceedings dated Mar. 25, 1999, 37 pages.
Minutes of the Oral Proceedings in accordance with Rule 76(4) from the European Patent Office in the opposition of EP 95908256.1, dated May 11, 1999, 31 pages.
Letter from Kirschner & Kurig representing Societe des Produits Nestle in the opposition of EP 95908256.1 dated Jan. 25, 1999, 15 pages.
Letter from Kirschner & Kurig representing Nestec S.A. in the opposition of EP 95908256.1 dated Feb. 25, 1999, 7 pages.
Letter from Mitscherlich & Partner representing Scholler Lebensmittel GmbH in the opposition of EP 95908256.1 dated Jan. 25, 1999, 9 pages, with what is believed to be an accurate English language translation, 8 pages.
Letter from Vriesendorp Gaada representing Nestle Nederland BV in the opposition of EP 95908256.1 dated Jan. 22, 1999, 9 pages.
Opposition statement by Mr. T. J. R. Wilson on behalf of Yorkshire Dales Ice Cream Limited in opposition to EP 9 710 004B dated Jan. 19, 1999, 6 pages.
Observation by Opponent Frisa N.V. in the opposition of EP 9 710 074 dated Jan. 21, 1999, 11 pages.
Notification under Section 28(1) from Tip Top Ice Cream Company Limited in Australian Petty Patent 685040 in the name of Unilever PLC dated Dec. 8, 1998, 16 pages.
Statutory Declaration of Dr. N. A. Thomas dated Dec. 8, 1998, 8 pages.
Statutory Declaration of M. R. Taylor dated Dec. 8, 1998, 22 pages.
Confidential Resume of M. R. Taylor dated Dec. 8, 1998, 7 pages.
Statutory Declaration of A. D. Dark dated Dec. 7, 1998, 3 pages.
Exhibit "ADD–15" referred to in the Statutory Declaration of A. D. Dark dated Dec. 7, 1998 —Australian Patent Office Document No. AU–B–16644/95 ( 1 page) and WO 95/20883, 12 pages, with International Search Report, 2 pages.
Exhibit "ADD–16" referred to in the Statutory Declaration of A. D. Dark dated Dec. 7, 1999—letter from U. Perenez, Streets Ice Cream to Mr. Ray O'Connor, dated Jan. 15, 1996, 2 pages.

Exhibit "ADD–17" referred to in the Statutory Declaration of A. D. Dark dated Dec. 7, 1998—letter to Mr. Ray O'Connor, Tip Top Ice Cream Company from Unilever Australia dated Mar. 7, 1997 and letter to Unilever Australia Limited from Ray O'Connor dated May 20, 1997, 4 pages.

Exhibit "ADD–18" referred to in the Statutory Declaration of A. D. Dark dated Dec. 7, 1998—European Patent Office Communication pursuant to Article 96(2) and Rule 51(2) EPC dated Mar. 30, 1996, 8 pages.

Exhibit "Add–19" referred to in the Statutory Declaration of A. D. Dark dated Dec. 7, 1998—letter to the Commissioner of Patents, Australian Industrial Property Organisation from B. F. Jones, Unilever Australia Limited dated May 20, 1997, 6 pages.

Statutory Declaration of A. D. Dark dated Dec. 8, 1998 with Exhibit "ADD–20" referred to in the Statutory Declaration of A. D. Dark dated Dec. 8, 1998—letter to Davies Collison Cave from Alex Jaksic, Australian Patent Office, 4 pages.

Statutory Declaration of R. Hay dated Dec. 8, 1998 with Exhibit "RH1" referred to in the Statutory Declaration of R. Hay dated Dec. 8, 1998—letter to Davies Collision Cave from The University of New South Wales dated Dec. 8, 1998, 4 pages.

Statutory Declaration of E. Best dated Dec. 1, 1998, 2 pages.

Exhibit "EB–1" referred to in the Statutory Declaration of E. Best dated Dec. 1, 1998—Specific Experience in the Ice Confectionery Field, 54 pages.

Exhibit "EB–2" referred to in the Statutory Declaration of E. Best dated Dec. 1, 1998—Details of Samples and Preparation Procedures, 4 pages.

Exhibit "EB–3" referred to in the Statutory Declaration of E. Best dated Dec. 1, 1998—Ice Particle Sizes—Results Organized by Patent, 2 pages.

Exhibit "EB–4" referred to in the Statutory Declaration of E. Best dated Dec. 1, 1998—Ice Particle Sizes—Results Organized by Coating Hardness, 2 pages.

Exhibit "EB–5" referred to in the Statutory Declaration of E. Best dated Dec. 1, 1998—Ice Particle Sizes—Results Organized by Ice Particle Size, 2 pages.

Exhibit "EB–6" referred to in the Statutory Declaration of E. Best dated Dec. 1, 1998—dated Dec. 1, 1998, 22 pages.

Exhibit "EB–7" referred to in the Statutory Declaration of E. Best dated Dec. 1, 1998—Evaluation of Texture Properties in Four Fruit Based Water Ice Coatings, 6 pages.

Statutory Declaration of T. Pritchard dated Dec. 7, 1998, 8 pages.

Exhibit "TP–1" referred to in the Statutory Declaration of T. Pritchard dated Dec. 7, 1998—Career Resume, 3 pages.

Exhibit "TP–2" referred to in the Statutory Declaration of T. Pritchard dated Dec. 7, 1998—AU Petty Patent Claims, 2 pages.

Exhibit "TP–3" referred to in the Statutory Declaration of T. Pritchard dated Dec. 7, 1998—Evaluation of Three Ice Creams Produced According to the Patents of Unilever and Kanebo, 6 pages.

Statutory Declaration of H. G. Ivory dated Nov. 16, 1998, 37 pages.

Exhibit HGI–I referred to in the Statutory Declaration of H. G. Ivory dated Nov. 26, 1998—Curriculum Vitae, 10 pages.

Statutory Declaration of T. Amend dated Dec. 7, 2 pages.

Exhibit TA–I referred to in the Statutory Declaration of T. Amend dated Dec. 7, 1998—Qualifications, 3 pages.

Exhibit TA–2 referred to in the Statutory Declaration of T. Amend, dated Dec. 7,—Evaluation of Three Ice Creams Produced According to the Patents of Unilever and Kanebo; Exhibit "TA–3" referred to in the Statutory Declaration of T. Amend dated Dec. 7 Analytical Data; Exhibit "TA–4" referred to in the Statutory Declaration of T. Amend dated Dec. 7,—Recipe of the Water Ice Coating for the Ice Cream Sticks; and Exhibit "TA–5" referred to in the Statutory Declaration of T. Amend dated Dec. 7—Photographs A, B and C, 9 pages.

Statutory Declaration of T. J. Reid dated Dec. 3, 1998; 3 pages.

Exhibit "TJR–1" referred to in the Statutory Declaration of T. J. Reid dated Dec. 3, 1998—Further Statutory Declaration including Curriculum Vitae, 30 pages.

Exhibit "TJR–2" referred to in the Statutory Declaration of T. J. Reid dated Dec. 3, 1998—Claims, 3 pages.

Exhibit "TJR–3" referred to in the Statutory Declaration of T. J. Reid dated Dec. 3, 1998—Claims, 2 pages.

Exhibit "TJR–4" referred to in the Statutory Declaration of T. J. Reid dated Dec. 3, 1998—Claims, 3 pages.

Statutory Declaration of P. G. Harrison dated Dec. 30, 1998, 2 pages.

Statutory Declaration of N. A. Pettit–Young dated Dec. 3, 1998, 3 pages.

Statement of Grounds and Particulars in the Australian Patent Application No. 681,008 (16644/95) in the name of Unilever PLC in an opposition by Nestec S.A. dated Feb. 13, 1998, 11 pages.

Affidavit of P. B. Kain dated Mar. 3, 1999, 3 pages.
Affidavit of R. L. Vuille dated Feb. 16, 1998, 5 pages.
Affidavit of J. E. Jones dated Apr. 16, 1998, 4 pages.
Affidavit of B. K. Fletcher dated Dec. 23, 1998, 3 pages.
Affidavit of C. K. Kane dated Mar. 10, 1999, 21 pages.
Affidavit of J. A. Broughan dated Nov. 17, 1998, 5 pages.
Affidavit of E. T. Best dated Mar. 3, 1998 74 pages.
Derwent abstract of DE 2 052616.
Arbuckle, "Ice Cream", Van Nostrand Reinhold, Fourth Edition, pp 290–295 (1986).
European File History.
Pleading Notes of J. van Arkle in the Dutch Appeal and translation.
Pleading Notes of J. van Arkle in Dutch First Instance.
Translation of Nestle's Reply to Appeal in Italy.
Fennema et al., "Fundamentals of Low–Temperature Food Preservation", Advances in Food Research, vol. 13, pp 219–347 (1964).
Unilever's Pleading Statement Against Nestle—pp. 7 and 8 in the Dutch Litigation.
Appeal document of Nestec S.A. (pp. 1–52—English).
D1A: Product leaflet VitaLine. (5 pages).
D1B: Sales offer regarding a VitaLine Model 14 dated Jul. 25, 1973. (1 page—German and translation).
D22: Experiment report and results. (2 pages—Charts I & II).
D22A: Statutory declaration of Mr. Eric Best on the experiment. (6 pages—plus 2 pages of charts "D22").
D23: U.S. application No. 4,826,656 (Pioneer Potato Company).
D24: Arbuckle, Ice Cream $4^{th}$ Edition (1986). (pp. 290–291).
Scholler appeal in German. (21 pages—Both sides).
Scholler appeal in English. (18 pages—Both sides).
Midor appeal in German. (25 pages—Both sides).
Midor appeal in English. (16 pages—Both sides).

Nestle B.V. appeal in English. (19 pages—Both sides).

Arbuckle 4$^{th}$ Edition (1986). (pp. 88, 264, 265, 289, and 291).

Yorkshire Dales appeal in English. (Cover plus pp. 1–8).

Frisa NV appeal in English. (Cover plus pp. 1–13).

Communication from Yorkshire Dales in the European Opposition Proceedings to EP 95/908256.1 dated Mar. 22, 1999 3 pages.

The Concise Oxford Dictionary, Sixth Edition (1976). Definition of "immerse" filed by Unilever in the European Opposition—3 pages.

"Chill Out" from a Safeway customer magazine filed by Unilever in the European Opposition—3 pages.

Additional Documents Relating to the Opposition by Tip Top in the Australian Patent Office.

Statutory Declaration of G. Cesalli dated Jan. 22, 1999 with Exhibits GC–1, GC–2, Claims and GC–3, 22 pages.

Additional Documents Relating to the Opposition by Nestec S.A. in the New Zealand Patent Office.

Notice of Opposition to Grant Patent (Section 21) filed by Nestec SA dated Jun. 20, 1997—15 pages.

First Amended Statement of Case filed by Tip Top Ice Cream Company—27 pages.-

METHOD OF MAKING ICE CONFECTIONS

This is a continuation, application of Ser. No. 08/384,285, filed Feb. 1, 1995, now abandoned.

FIELD OF THE INVENTION

This invention relates to ice confections which comprise a mass of a milk containing frozen confection, for example ice cream, with a surface covering of water ice. Products of this form are usually referred to as "splits" and this term will be used. This product form provides two refreshing ice compositions within a single body.

BACKGROUND TO THE INVENTION

Splits are usually sold with an ice cream core, as an example of a milk based frozen confection, with a stick for holding the product and an outer layer of water ice. However, they are not limited to this geometry and may be in other shapes, e.g. spherical, and can be in a container for consumption. For example an ice cream could be produced in a standard tub with a layer of water ice on top. The term "split" is used herein to be a mass of ice confection having a layer of water ice in contact with it.

The milk containing frozen confection contains milk proteins and the class includes ice cream, frozen yoghurt, sherbet, sorbet, ice milk and frozen custards. The usual form of protein will be animal milk but vegetable sources, e.g. soya milk, are also usable. There is no criticality in the source of the milk protein and it may be incorporated as liquid milk, cream, skimmed milk, milk powder and skimmed milk powder, as examples.

One known method of manufacturing split products is to partially freeze a water ice composition in the form of a cylinder closed at one end and then fill the centre core with liquid ice cream composition. Typically the water ice solution is placed in a cone in a freezing bath. The cone is inverted when the water ice contacting the cone wall is frozen and then an ice confection placed in the core. A stick for hand holding is placed in the core.

The manufacture of a two component ice confection by this route requires careful manipulation of the feedstocks and the several stages of handling. There is usually a restriction in the product geometry which can be obtained. The levels of overrun in the ice confection are limited because at higher levels the ice confection is more viscous.

LITERATURE

Ice confections have been well characterised in the literature and general disclosures will be found in "Ice Cream" by W S Arbuckle (published by AVI of Westport, Conn. USA) in 4 editions and *J Soc Dairy Technology* 1990, 43(1), pp 17–20.

GENERAL DESCRIPTION OF THE INVENTION

The invention provides a method of preparing a two component ice confection in which (i) a surface of a mass of milk containing ice confection is brought to a temperature of below about −15° C., preferably below about −25° C. and more preferably below about −40° C., (ii) the surface is contacted with a water ice solution having a solids content between about 15% and about 50% by weight for a time sufficient to allow a layer of water ice to form on the surface and (iii) the whole is subjected to a hardening step to form the water ice layer. This step is performed at the temperature of step (i) or preferably below. Water ice forms during the pick up but the layer is completed in the hardening step. Preferably the two component ice confection formed by this process comprises a mass of milk containing ice confection having a water ice on at least one surface having an average ice crystal size ($D_{(3,0)}$) below 100 micron more preferably below 80 micron. This method provides a water ice layer which has consistent texture and can have a range of thickness. The low temperature of the ice confection core can be obtained in a refrigerated volume, for example a blast cooler, or preferably by immersion in a cryogenic liquid, e.g. liquid nitrogen.

The product of this invention comprises two essential components, the ice confection mass and the water ice layer. Additional optional components may be present, examples are syrup, nuts, chocolate pieces and fruit pieces.

The amount of water ice solution picked up after immersion is determined by the temperature of the ice confection core, while the ice crystal size is determined predominantly by the temperature of the hardening step. Thus, if the core was at −15° C. prior to immersion and the hardening step (iii) was obtained by immersion in liquid nitrogen then the water ice will have the desirable size of ice crystals but only a thin layer will be present. Hardening the product at −15° C. provides a thin layer with relatively large crystals. Similarly, a core cooled in liquid nitrogen but hardened at −15° C. will give relatively large amount of pick-up but a water ice with relatively large crystals.

The water ice component may contain low amounts of a fat containing material, e.g. milk, provided its presence does not interfere with the water crystallisation. The water ice maybe aerated.

The preferred average ice crystal size $D_{(3,0)}$ of 80 micron is generally obtained by using liquid nitrogen or other cryogenic liquid for both steps (i) and (iii). Using temperatures of about −40° C., provided for example by a blast freezer tunnel, in both steps (i) and (iii) provides a water ice layer with ice crystals having a $D_{(3,0)}$ of below 100 microns.

Consumer tests have shown the presence of water ice crystals below about 80 microns provide a particularly soft texture.

The method of the invention uses process steps which are easy to operate sequentially and uses apparatus and cooling materials which are either in wide use or are available commercially and are easily handled.

The surface of the milk containing ice confection is preferably brought to the desired low temperature by immersing it in liquid nitrogen or other liquified gas at low temperature, or contacting the desired surfaces with a heat exchanging surface cooled to an appropriate low temperature, for example with an innocuous liquid refrigerant such as liquid nitrogen or a solid refrigerant such as carbon dioxide.

In another method successive layers of water ice can be laid down on the surface of the mass of milk containing ice confection by immersing the mass in water ice solution and then in a suitable cryogenic liquid or in a refrigerated volume at low temperature to make another layer of water ice. These stages can be repeated to build up a thicker layer of water ice.

The preferred viscosity of the water ice solution is up to 5 poise to provide optimum generation of the water ice layer. A 0.2% w/w aqueous solution of locust bean gum (LBG) has a viscosity of about 1 poise.

It is not necessary for the second cooling stage to be at the same temperature as the stage cooling the core. Thus, dependent on the apparatus available and desired product properties, it may be at a higher or lower temperature.

The ice confection core can be subjected to a moulding stage prior to immersion in the water ice solution. With suitable design and thickness of water ice layer the final product will exhibit the moulding. The ice confection may contain fruit pieces, nuts and syrup, as examples of other optional components. Usually the confection will include a stick penetrating the core to allow it to be held in the hand.

The relatively small ice crystal size and orientation of the water ice and selection of the total solids provides a soft texture to the water ice when bitten. The texture of the milk protein containing ice confection is also very good because it is formed as the core by standard processing steps. There is no restriction or overrun which will usually be in the range from about 50% to about 150%. Additionally, the use of standard processes allows the usual components, e.g. fats to be present at the usual levels. Thus there is no restriction on the ice confection caused by viscosity requirements to allow feed. into a quiescently formed water ice shell. A product formed by the quiescent process will have larger ice crystals, for example some in the order of millimetres. In general quiescently frozen products have dendritic ice crystals, while those produced according to the present invention have a more rounded shape comparable to those obtained in a freezer barrel. A complete quiescently formed split was found to be harder to bite, crunchier and less chewy. The water ice layer was less adhesive to the core.

A solids level of below about 15% in the water ice will give only a small amount of structuring and flavour while about 50% the solids content provide a very soft water ice layer.

Slushes, i.e. water ice solutions containing ice crystals, are usable in the invention to prove a roughened water ice layer. These ice crystals may include a gas clathrate, for example as described in EP 0201143. The ice crystals formed by the process of the present invention provide a soft texture.

Test Methods

Ice crystal size: a thin water ice sample was examined using a cold stage (−20° C.) microscope in a white spirit matrix. Polarising filters were used at ×100 magnification to obtain maximum contrast and a Zeiss particle size analyzer used to obtain the average ice crystal size as $D_{(3,0)}$.

SPECIFIC DESCRIPTION OF THE INVENTION

Examples of the invention will now be given to illustrate but not limit the invention.

EXAMPLE I

An ice cream formulation with the following composition was prepared using standard techniques.

| Ingredient | Weight % |
| --- | --- |
| skimmed milk powder | 10.0 |
| sugars | 17.2 |
| butter | 10.5 |
| flavour | 0.1 |
| water | 61.5 |

-continued

| Ingredient | Weight % |
| --- | --- |
| emulsifier | 0.4 |
| stabilizer | 0.25 |

The ice cream was prepared with an overrun of 100%, extruded through a shaped nozzle to give a cylinder of 56 g and the stick inserted. It was then hardened in a freezing tunnel at −40° C. After leaving the tunnel the portions were dipped in liquid nitrogen for 8 seconds and then in a water ice solution at 5° C., which is the usual temperature of storage, for 15 seconds. This solution had a composition of:

| Ingredient | Weight % |
| --- | --- |
| sugars | 21.5 |
| stabiliser (LBG) | 0.4 |
| fruit solids | 4.4 |
| citric acid | 0.2 |
| colour | 0.2 |
| water | remainder |

The excess water ice solution was allowed to drip off and then the portions were immersed in liquid nitrogen to harden the external surface and complete the formation of the water ice layer. The product contained 25 g water ice in the external layer.

The products were then stored at about −30° C. in a cold store before distribution. The particle size distribution ($D_{(3, 0)}$) in the water ice layer immediately after preparation was about 55 micron; this increased to about 75 microns on storage during distribution.

EXAMPLE II

Samples of the ice cream core prepared as in Example I were cooled to temperatures of −15° C., −25° C., −30° C. and −40° C. in a refrigerated volume. They were then immersed in the Example I water ice solution for 10 seconds and the products hardened at the above temperatures.

The results are shown in Table I with the Example I results included for comparison. It is seen the amount of water ice reduces as the core temperature rises. Increased amounts of water ice can be picked up by using more cycles of cooling/immersion.

TABLE I

| Temperature of core ° C. | Hardening Temp ° C. | Weight of water ice (g) |
| --- | --- | --- |
| Liq N$_2$* | Liq N$_2$* | 25 |
| −40 | −40 | 18 (A) |
| −30 | −30 | 14 |
| −25 | −25 | 13 |
| −15 | −15 | 8 (B) |

*8 seconds exposure

The products (A) using −40° C. for the core temperature and hardening stage had a $D_{(3,0)}$ of 85 microns, while the products (B) using −15° C. for the core temperature and hardening stage had a $D_{(3,0)}$ of above 200 microns.

What is claimed is:

1. A method of preparing a two-component ice confection comprising:

i) cooling a surface of a mass of milk containing ice confection to a temperature of below about −25° C., ii) immersing the surface in a water ice solution having a solids content between about 15% and about 50% by weight for a time sufficient to allow a layer of water ice to form on the surface, and iii) the formation of the water ice layer of step (ii) is completed by a hardening step, whereby the whole water ice layer is cooled to a temperature below −15° C. in a refrigerated volume at −40° C. or below or by immersion in a cryogenic liguid.

2. A method according to claim 1 wherein the temperature in step i) is below about −40° C.

3. A method according to claim 1 in which steps ii) & iii) are repeated to build up successive layers of water ice.

4. A method according to claim 1 wherein the cooling process in step i) is obtained by immersion in a cryogenic liquid.

5. A method according to claim 1 wherein the mass of milk containing ice confection is prepared by extrusion.

6. A method according to claim 1 wherein any excess water ice solution following immersion in step ii) is allowed to drip off before the hardening step iii).

\* \* \* \* \*